Patented Aug. 8, 1950

2,517,765

UNITED STATES PATENT OFFICE 2,517,765

PRODUCTION OF DEHYDRATED CASTOR OIL

Charles Adams Coffey and William T. Walton, Chicago, Ill., assignors to The Sherwin-Williams Company, Cleveland, Ohio, a corporation of Ohio No Drawing. Application September 19, 1945, Serial No. 617,440

15 Claims. (Cl. 260—405.5)

This invention relates to the preparation of dehydrated castor oil and more particularly to the preparation of a bodied dehydrated castor oil which has a relatively pale color, preferably not darker than 4 on the Hellige-Klett scale.

As is well known, a pale color is very desirable in dehydrated castor oil used as a drying oil in paints and varnishes. One of the difficulties heretofore in the preparation of dehydrated castor oil has been the darkening of the oil which occurs to some extent during the dehydrating step and usually to a greater extent during the subsequent polymerization or bodying step. In some processes for preparing dehydrated castor oil the oil is so dark at the end of the dehydration step that there is no point in continuing with the bodying or polymerization of the oil because the resultant product would obviously be unsatisfactory. In other cases, the oil may be fairly light at the end of the dehydration step but may darken to such an extent during the bodying step that it is unsuitable for commercial use in the preparation of high quality products.

One of the objects of the present invention is to provide a new and improved process for dehydrating castor oil which results in a dehydrated castor oil having a pale initial color and which does not darken during the bodying process to a color darker than 4 on the Hellige-Klett scale.

A further object of the invention is to provide a new and relatively simple process for producing a pale-colored dehydrated castor oil.

Other objects will appear hereinafter.

In accomplishing these objects in accordance with this invention it has been found that new and improved results in the preparation of dehydrated castor oil are obtained by dehydrating the castor oil in the presence of a small but effective amount of sulfuric acid as a catalyst by:

(1) Incorporating the catalyst with a diluent;
(2) Adding the diluted catalyst in increments during the dehydration process; and
(3) Effecting the dehydration process in the presence of an antioxidant.

By carrying out the dehydration of the castor oil in this manner, atmospheric pressures can be used while still obtaining a light-colored end product. In procedures heretofore proposed for the dehydration of castor oil utilizing sulfuric acid as a catalyst a much darker product is obtained at atmospheric pressures.

The catalyst diluent for the purpose of the invention is preferably a substance which is a common solvent for a sulfuric acid catalyst and the castor oil. Among the suitable diluents are the following:

Methyl alcohol
Ethyl alcohol
Butyl alcohol
Acetic acid
Acetone, and
Castor oil

As an example of a suitable diluent which is not a common solvent for both the sulfuric acid and the castor oil, water may be mentioned.

Examples of the antioxidants which are suitable for the practice of the invention are:

Phosphoric acid
Beta naphthol
Phenol
Citric acid
Maleic anhydride
Hydroquinone
Glutamic acid
Chlorophyll, and
Glycerine The antioxidant is preferably added to the reaction mixture with the catalyst solution. The antioxidant solubility in the dehydration catalyst solution may be small or infinite since only small percentages of antioxidants are required to produce the effect desired.

The composition of the reaction kettle surfaces apparently has a marked relationship to the effectiveness of the antioxidant, and the results obtained may vary depending upon the composition of such surfaces. In the practice of the invention it is preferable to employ a reaction kettle having stainless steels walls, although good results have been obtained with processes involving the use of some antioxidants in kettles having glass walls. In certain cases good results are obtained both with glass-walled and stainless steel-walled kettles.

The catalyst solution should be added in increments during the dehydration process, either continuously, or at intervals during the period of the reaction, preferably in substantially uniform amounts.

The invention will be further illustrated but is not limited by the following examples, in which the proportions are stated in parts by weight unless otherwise indicated.

Example I

One hundred (100) gallons of raw castor oil were charged into a stainless steel varnish kettle equipped with a blowing coil fitted to an inert gas line (e. g., carbon dioxide). With a moderate carbon dioxide blow, sufficient to roll the oil, the castor oil was heated rapidly to 210° F. at atmospheric pressure. At this point the addition of the dehydrating catalyst solution was started. The catalyst, which was added continuously, comprised a mixture of:

1.25 gallons of ethyl alcohol
10.5 ounces of 85% ortho phosphoric acid
14 ounces of C. P. 94.5–96% sulfuric acid The addition of the catalyst solution conformed to the schedule indicated below:

| Time (min.) | Oil, °F. | Per Cent Catalyst Added |
|---|---|---|
| 0 | 210 | Start |
| 15 | 325 | ⅛ |
| 30 | 375 | ¼ |
| 45 | 500 | ½ |
| 60 | 500 | ¾ |
| 75 | 510 | all added |

At this point, the dehydration of the oil was substantially complete and it had a viscosity of K–M on the Gardner-Holdt scale.

The temperature of the oil was then raised to a bodying temperature of about 585° F. and held at that temperature for about 1 hour and 15 minutes. The resultant bodied dehydrated castor oil had the following characteristics:

Viscosity _____ Z–2 (Gardner-Holdt)
Color _____ 2L–2
Acid value _____ 12
Refractive index _____ 1.4885 at 25° C.

This oil had excellent drying properties and was sufficiently light in color for commercial use in varnishes and paints of high quality.

It will be noted that all of the steps in this process were carried out at atmospheric pressure, making it unnecessary to provide equipment for maintaining a vacuum, as is required in some procedures for producing dehydrated castor oil using a sulfuric acid catalyst.

Example II

The procedure was similar to that described in Example I, except that 31.5 pounds of raw castor oil were employed, the reaction vessel was equipped with mechanical agitation, the catalyst solution comprised 31.4 grams of sulfuric acid in 630 cc. of ethyl alcohol, and the antioxidant consisted of 62.8 grams of beta naphthol. A light blow of carbon dioxide was employed. The product obtained from the dehydration step had a color of 3L (Hellige-Klett), a refractive index of 1.4814 at 25° C., a viscosity of —J (Gardner-Holdt), and an acid value of 8.9.

After bodying as described in Example I the dehydrated castor oil had a refractive index of 1.4870 at 25° C., a color of 4, a viscosity of Z–2, and an acid value of 11.6.

If the quantity of solvent is reduced by one-half, that is to 10 cc. per pound of oil instead of 20 cc. per pound of oil, all other conditions being the same, the color at the end of the dehydration step is paler and corresponds to the color of 2 on the Hellige-Klett scale, the viscosity is H on the Gardner-Holdt scale, and the acid value remains the same at 8.9. However, when this oil is bodied as described in Example I it darkens to a color of 7. The refractive index becomes 1.4880 at 25° C., the viscosity is Z–2 (Gardner-Holdt), and the acid value is 10.3. This indicates that the minimum amount of the catalyst dilution is a factor in the final color of the bodied oil.

Example III

The procedure was the same as in Example I except that a glass vessel was used equipped with mechanical agitation, 2 pounds of oil were employed, the catalyst solution consisted of 1.5 grams of sulfuric acid in 30 cc. of ethyl alcohol per pound of oil, and the antioxidant consisted of 3 grams of beta naphthol. A light blow of carbon dioxide was employed. The dehydrated castor oil at the end of the dehydration step had a color of 1 to 2L on the Hellige-Klett scale, a refractive index of 1.4813 at 25° C., a viscosity of —L (Gardner-Holdt), and an acid value of 7.1.

After bodying as described in Example I the dehydrated bodied oil had a color of 3–4L on the Hellige-Klett scale, a refractive index of 1.4885 at 25° C., a viscosity of Z–1 (Gardner-Holdt), and an acid value of 14.9.

Example IV

Two (2) pounds of raw castor oil were placed in a glass vessel equipped with a mechanical stirrer. With a moderate inert gas blow of carbon dioxide the castor oil was heated rapidly to 210° F. at atmospheric pressure. The addition of a dehydrating catalyst solution was then started, the catalyst in this case comprising a mixture of 60 cc. of water, 3 grams of citric acid and 2 grams of C. P. 94.5–96% sulfuric acid. The addition was continued over a scheduled period in the manner described in Example I. The resultant dehydrated castor oil had the following characteristics:

Viscosity _____ M (Gardner-Holdt)
Color _____ 2–3L
Acid value _____ 10.1
Refractive index _____ 1.4809 at 25° C.

The temperature of the oil was then raised to bodying temperature of 585° F. and held at that temperature for about 1 hour and 15 minutes. The resultant bodied dehydrated castor oil had the following characteristics:

Viscosity _____ Z–2 (Gardner-Holdt)
Color _____ 2
Acid value _____ 14.9
Refractive index _____ 1.4885 at 25° C.

Example V

The procedure described in Example IV was carried out using 3 grams of glutamic acid instead of the citric acid, and 1.5 grams of C. P. 94.5–96% sulfuric acid instead of the 2 grams of sulfuric acid.

The dehydrated castor oil had the following characteristics:

Viscosity _____ L (Gardner-Holdt)
Color _____ 2L
Refractive index _____ 1.4810 at 25° C.

After bodying in the manner described in Example IV the resultant bodied drying oil had the following characteristics:

Viscosity _____ Z
Color _____ 4
Refractive index _____ 1.4870 at 25° C.

Example VI

Sixteen (16) pounds of raw castor oil, to which had been added 6 grams of phosphoric acid, were charged into a stainless steel varnish kettle and given a moderate blow with carbon dioxide sufficient to roll the oil. The oil was then heated to a temperature of approximately 210° F. at atmospheric pressure and a diluted catalyst was added comprising 1 ounce of ethyl alcohol per gallon of raw castor oil, 8 grams of C. P. 94.5-96% sulfuric acid, together with 60 grams of beta naphthol. The catalyst solution was added in the manner described in Example I, and the resultant dehydrated castor oil at the completion of the dehydration step had the following characteristics:

Viscosity ---------------- -L (Gardner-Holdt)
Color -------------------- 2
Refractive index -------- 1.4815 at 25° C.

The dehydrated oil was then bodied as described in Example I to produce a bodied oil having the following characteristics:

Viscosity ---------------- Z-2 (Gardner-Holdt)
Color -------------------- 4L-4
Refractive index -------- 1.4889 at 25° C.

*Example VII*

Sixteen (16) pounds of raw castor oil, together with 6 grams of C. P. 85% ortho phosphoric acid and 10 grams of 95% ethyl alcohol were charged into a stainless steel varnish kettle and heated to a temperature of approximately 210° F. at atmospheric pressure with a moderate blow of carbon dioxide sufficient to roll the oil. A catalyst solution comprising a mixture of 1 ounce per gallon (calculated on the castor oil) of ethyl alcohol, 30 grams of beta naphthol, and 8 grams of C. P. 94.5-96% sulfuric acid was then added gradually in accordance with the schedule described in Example I.

The resultant dehydrated castor oil had a color of 2L and a refractive index of 1.4810.

The temperature of the oil was then raised to a bodying temperature of about 585° F. and held at that temperature for about 1 hour and 15 minutes. The bodied dehydrated castor oil had the following characteristics:

Viscosity ---------------- Z-5
Color -------------------- 4L-4
Acid value -------------- 13.5
Refractive index -------- 1.4895 at 25° C.

*Example VIII*

One hundred (100) gallons of raw castor oil containing 10.5 ounces of C. P. 85% ortho phosphoric acid were charged into a stainless steel vessel and processed according to the procedure described in Example I except that the catalyst solution comprised 132 ounces per gallon of ethyl alcohol, 52 ounces of beta napthol, and 14 ounces of C. P. 94.5-96% sulfuric acid.

The oil at the completion of the dehydration step had the following characteristics:

Viscosity ---------------- M (Gardner-Holdt)
Color -------------------- 2L
Acid value -------------- 7.6
Refractive index -------- 1.4820

After the bodying step the resultant product had the following characteristics:

Viscosity ---------------- Z-4 (Gardner-Holdt)
Color -------------------- 4L
Acid value -------------- 16.8
Refractive index -------- 1.4893 at 25° C.

*Example IX*

The process was carried out as in Example VIII except that 26 ounces of beta naphthol were employed instead of the 52 ounces used in Example VIII. The oil at the end of the dehydration step had a viscosity of -N on the Gardner-Holdt scale, and a refractive index of 1.4818.

After the bodying step the oil had the following characteristics:

Viscosity ---------------- Z-2
Color -------------------- 3L-3
Acid value -------------- 13.2
Refractive index -------- 1.4888 at 25° C.

*Example X*

The process was carried out as in Example VIII except that the amount of beta naphthol was still further reduced to 13 ounces instead of the 52 ounces used in Example VIII. After the dehydration step the dehydrated castor oil had the following characteristics:

Viscosity ---------------- -M
Color -------------------- 2L
Refractive index -------- 1.4812

When this oil was bodied as described in Example I it had the following characteristics:

Viscosity ---------------- Z-2
Color -------------------- 3
Acid value -------------- 14.1
Refractive index -------- 1.4885

*Example XI*

One hundred (100) gallons of raw castor oil were charged into a stainless steel vessel and blown with carbon dioxide as in Example I while heating to a temperature of 210° F. at atmospheric pressure. At this point a dehydrating catalyst solution was added which comprised a mixture of 132 ounces of ethyl alcohol and 23 ounces of C. P. 94.5-96% sulfuric acid solution. No antioxidant was employed in this run.

The catalyst solution was added according to the schedule described in Example I. At the completion of the dehydration step the dehydrated castor oil had the following characteristics:

Viscosity ---------------- -L (Gardner-Holdt)
Color -------------------- 3L
Refractive index -------- 1.4810 at 25° C.

The oil was then bodied as described in Example I to produce a product having the following characteristics:

Viscosity ---------------- Z (Gardner-Holdt)
Color -------------------- 4
Refractive index -------- 1.4875 at 25° C.
Acid value -------------- 14.8

In a similar manner the invention may be practiced with other diluents and antioxidants. As illustrated by Example XI, the antioxidant may be omitted but better results are obtained if it is included. As illustrated by Examples VIII to X, mixtures of antioxidants can be employed. The preferred antioxidants for the purpose of the invention are ortho phosphoric acid and beta naphthol, or mixtures thereof. If ortho phosphoric acid is employed, the quantity used is preferably within the range of 0.05% to 0.1% calculated on the weight of the raw castor oil. If beta naphthol is employed, the amount used is preferably within the range of 0.1% to 0.8%, calculated on the weight of the oil. If other antioxidants are used the amounts may vary somewhat but are normally within the range of about 0.05% to 1% by weight of the oil.

The amount of sulfuric acid employed as a catalyst is a small but effective amount, preferably within the range of 0.025% to 0.3% based on the weight of the raw castor oil.

The proportion of diluent or solvent employed in preparing the diluted catalyst solution is also subject to some variation, depending upon the type of diluent employed. With small two-pound batches good results were obtained within the range of 0.78% to 3.4% by weight of diluent based on the weight of the oil. With the somewhat larger batches involving the use of 16 pounds and 31.5 pounds of raw castor oil the amount of diluent employed was within the range of 0.78% to 1.7% based on the weight of the oil. In plant-scale operation with batches of the type described for instance in Example I, good results are obtained with relatively small amounts of diluent within the range of 0.1% to 0.15% based on the weight of the oil. In general, therefore, the quantity of diluent employed is small and is usually within the range from about 0.05% to 5.0% based on the weight of the oil. The minimum amount is preferably at least 0.1% diluent by weight of the castor oil. Since the diluent will ordinarily vaporize or flash off at the temperatures of dehydration, the maximum amount does not appear to be critical.

The weight ratio of diluent to sulfuric acid may vary somewhat but is usually within the range of 1:1 to 70:1, and is preferably at least 2:1. Excellent results have been obtained with a weight ratio of diluent to sulfuric acid of approximately 10:1. Especially good results have been obtained by employing lower aliphatic alcohols, e. g. ethyl alcohol, as the diluent.

The weight ratio of antioxidant to sulfuric acid employed is usually within the range 0.3:1 to 10:1. With phosphoric acid, good results have been obtained with a ratio of $H_3PO_4:H_2SO_4$ of ⅓:1 to 1:1. With beta naphthol, good results have been obtained by using a weight ratio of beta naphthol to sulfuric acid within the range of 1.5:1 to 10:1.

During the addition of the catalyst solution the temperature should preferably be sufficiently high to produce substantial dehydration of the castor oil but insufficiently high to produce substantial polymerization or bodying of the oil. The maximum temperature during the dehydration preferably does not exceed about 550° F. As illustrated by the Examples, the polymerization or bodying of the oil is preferably effected in a subsequent step by continuing the heating of the oil at a higher temperature. The dehydration and polymerization temperatures are well known by those skilled in the art.

The process herein described may be carried out at atmospheric, sub-atmospheric, or super-atmospheric pressures, but one of its important advantages lies in the fact that it can be carried out at atmospheric pressures and still yield a product which is sufficiently pale for very high quality paints and varnishes. In processes heretofore proposed where sulfuric acid has been employed as a catalyst the process does not operate at atmospheric pressures to yield a bodied oil having a color as light as 4 on the Hellige-Klett scale. In order to obtain such light colored products it has been necessary with processes using a sulfuric acid catalyst to carry out the dehydration under vacuum, thereby necessitating the use of additional equipment and resulting in an increase in the cost of the product. The present invention, therefore, provides a method of making a dehydrated castor oil of the highest quality with less equipment and more simply than it has been possible to do so heretofore.

Having thus described the invention, what we claim as new and desire to secure by Letters Patent of the United States is:

1. In a process of dehydrating castor oil, the step which comprises adding to the castor oil in increments during the dehydration a dehydrating sulfuric acid catalyst solution containing a diluent, and effecting the dehydration at pressures which are at least atmospheric.

2. In a process of dehydrating castor oil, the step which comprises adding to the castor oil in increments during the dehydration a dehydrating sulfuric acid catalyst solution containing a diluent which is a common solvent for sulfuric acid and castor oil, and effecting the dehydration at pressures which are at least atmospheric.

3. In a process of dehydrating castor oil, the step which comprises adding to the castor oil in increments during the dehydration a dehydrating sulfuric acid catalyst solution containing a diluent and an antioxidant, and effecting the dehydration at pressures which are at least atmospheric.

4. The process of dehydrating castor oil which comprises dehydrating the castor oil by heating the castor oil in the presence of an antioxidant and adding to the castor oil in increments, during the dehydration, a dehydrating sulfuric acid catalyst solution containing a diluent, and effecting the dehydration at pressures which are at least atmospheric.

5. A process as claimed in claim 1 in which the sulfuric acid catalyst solution comprises about 0.025% to 0.3% by weight of sulfuric acid and about 0.05% to 5% by weight of diluent, said percentages being based on the weight of the castor oil.

6. A process as claimed in claim 3 in which the amount of antioxidant is within the range of 0.05% to 1% by weight of the castor oil.

7. A process of producing a dehydrated bodied castor oil having a color not darker than 4 on the Hellige-Klett scale, which comprises heating castor oil at atmospheric pressure and temperatures within the range of about 210° F. to about 550° F., adding to the oil during the heating and in increments a dehydrating sulfuric acid catalyst solution containing a diluent which is a common solvent for the sulfuric acid and the castor oil, the proportions of sulfuric acid being within the range of 0.025% to about 0.3% by weight of the oil, and the proportions of diluent being within the range of about 0.05% to 5% by weight of the oil, and thereafter bodying the oil to a viscosity within the range of Z to Z–5 (Gardner-Holdt).

8. A process of producing a dehydrated bodied castor oil having a color not darker than 4 on the Hellige-Klett scale, which comprises heating castor oil at atmospheric pressure and temperatures within the range of about 210° F. to about 550° F., adding to the oil during the heating and in increments a dehydrating sulfuric acid catalyst solution containing a diluent which is a common solvent for the sulfuric acid and the castor oil, the proportions of sulfuric acid being within the range of 0.025% to about 0.3% by weight of the oil, and the weight ratio of diluent to sulfuric acid being at least 1:1, and thereafter bodying the oil to a viscosity within the range of Z to Z–5 (Gardner-Holdt).

9. A process of producing dehydrated bodied castor oil having a color not darker than 4 on the Hellige-Klett scale, which comprises heating castor oil at atmospheric pressure and temperatures within the range of about 210° F. to about 550° F., adding to the oil during said heating and in increments a dehydrating sulfuric acid catalyst solution, an antioxidant, and an alcohol which is a common solvent for the sulfuric acid and the castor oil, and thereafter bodying the oil to a viscosity within the range of Z to Z-5 (Gardner-Holdt).

10. A process as claimed in claim 9 in which the antioxidant comprises 0.05% to 0.1% by weight of the oil of ortho phosphoric acid and the amount of sulfuric acid is within the range of 0.025% to 0.3% by weight of the oil.

11. A process as claimed in claim 9 in which the antioxidant comprises 0.1% to 0.8% of beta naphthol by weight of the oil and the amount of sulfuric acid is within the range of 0.025% to 0.3% by weight of the oil.

12. A process of producing a dehydrated bodied castor oil having a color not darker than 4 on the Hellige-Klett scale, which comprises heating castor oil at temperatures within the range of approximately 210° F. to 550° F. under substantially atmospheric pressures, adding to the oil during heating and in increments a dehydrating sulfuric acid catalyst solution containing sulfuric acid and a diluent which is a common solvent for the sulfuric acid and the oil, the proportions of sulfuric acid being within the range of 0.025% to 0.3% by weight of the oil, the weight ratio of diluent to sulfuric acid being at least 2:1 and not more than 70:1, and thereafter bodying the oil to a viscosity within the range of Z to Z-5 (Gardner-Holdt).

13. A process of producing a dehydrated bodied castor oil having a color not darker than 4 on the Hellige-Klett scale, which comprises heating raw castor oil under substantially atmospheric pressures at temperatures within the range of 210° F. to 550° F., with agitation, adding to the oil during the heating and in increments a dehydrating sulfuric acid catalyst solution containing 0.025% to 0.3% sulfuric acid, 0.05% to 0.1% ortho phosphoric acid, and a quantity of ethyl alcohol equal to at least 0.1% by weight of the oil, the weight ratio of ethyl alcohol to sulfuric acid being within the range of about 2:1 to about 70:1 and thereafter bodying the oil to a viscosity of approximately Z-2 (Gardner-Holdt).

14. The process of producing a dehydrated bodied castor oil having a color not darker than 4 on the Hellige-Klett scale, which comprises heating raw castor oil under substantially atmospheric pressures at temperatures within the range from about 210° F. to about 550° F., with agitation, adding to the oil during the heating and in increments a dehydrating sulfuric acid catalyst containing beta naphthol and ethyl alcohol, the proportion of sulfuric acid being within the range of 0.025% to 0.3% by weight of the oil, the proportion of beta naphthol being within the range of 0.1% to 0.8% by weight of the oil, and the proportion of ethyl alcohol being at least 0.1% by weight of the oil, the weight ratio of ethyl alcohol to sulfuric acid being within the range of about 2:1 to about 70:1 and thereafter bodying the oil to a viscosity within the range of Z to Z-5 (Gardner-Holdt).

15. In a process of dehydrating castor oil, the step which comprises adding to the castor oil in increments during the dehydration a dehydrating sulfuric acid catalyst solution containing a diluent which is a common solvent for the sulfuric acid and the oil, the weight ratio of diluent to sulfuric acid being within the range of about 2:1 to about 70:1, and effecting the dehydration at pressures which are at least atmospheric.

CHARLES ADAMS COFFEY.
WILLIAM T. WALTON.

REFERENCES CITED

The following references are of record in the file of this patent:

UNITED STATES PATENTS

| Number | Name | Date |
| --- | --- | --- |
| 1,892,258 | Ufer | Dec. 27, 1932 |
| 2,140,271 | Schwarcman | Dec. 13, 1938 |
| 2,189,772 | Auer | Feb. 13, 1940 |
| 2,213,944 | Auer | Sept. 10, 1940 |
| 2,304,074 | Cherry | Dec. 8, 1942 |
| 2,429,380 | Walton | Oct. 21, 1947 |

FOREIGN PATENTS

| Number | Country | Date |
| --- | --- | --- |
| 558,780 | Great Britain | Jan. 20, 1944 |